Aug. 12, 1952     R. NICCOLAI     2,606,326
DEVICE FOR THE DISCHARGE OF LIQUIDS FROM RECEPTACLES
Filed April 11, 1950
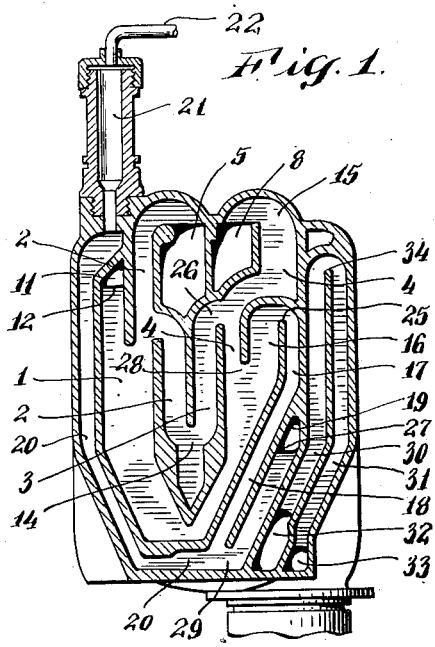
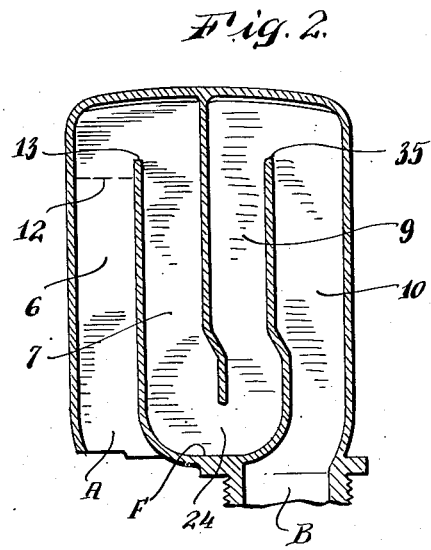
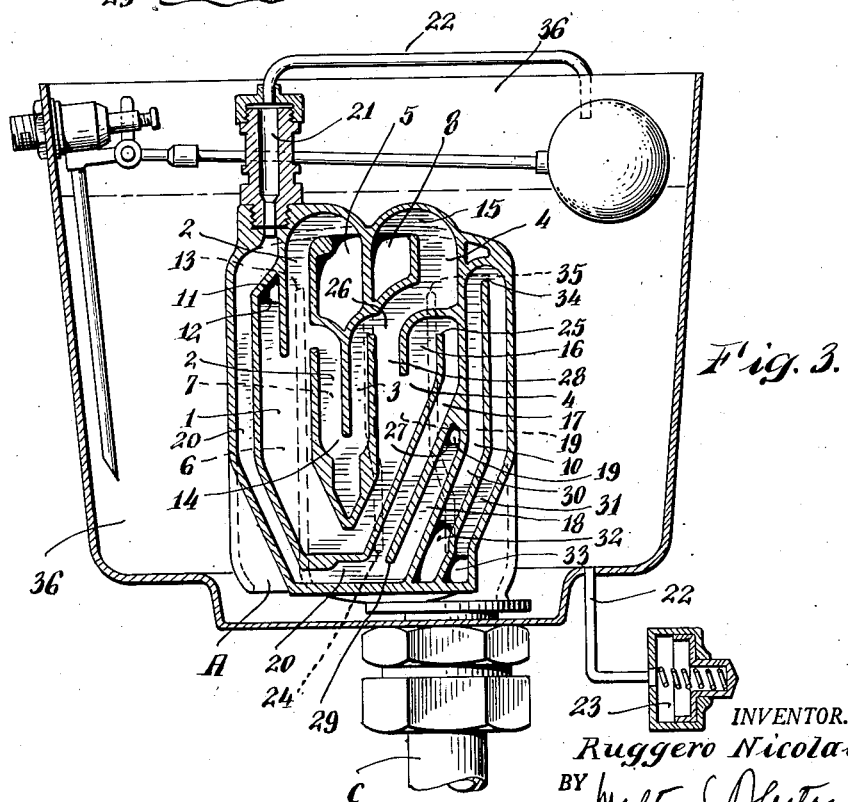
INVENTOR.
Ruggero Nicolai
BY
ATTORNEY.

Patented Aug. 12, 1952

2,606,326

UNITED STATES PATENT OFFICE 2,606,326

DEVICE FOR THE DISCHARGE OF LIQUIDS FROM RECEPTACLES

Ruggero Niccolai, Rome, Italy

Application April 11, 1950, Serial No. 155,148
In Italy April 21, 1949

6 Claims. (Cl. 4—43)

The invention refers to improvements in a device for discharging liquid from receptacles controlled by hydrostatic traps.

The device in accordance with the present invention comprises a chamber divided internally into two compartments separated from each other by an intermediate partition having openings for communication between the two compartments: one of which compartments contains a double siphon duct the inlet of which communicates with a reservoir of liquid while the outlet is connected to the discharge pipe of the system; the priming of the said siphon being effected by destroying the hydrostatic equilibrium of the liquid in the other compartment of the said chamber; the whole forming a hydrostatic seal or trap, and the disturbance of the hydrostatic equilibrium being effected by priming a small, auxiliary siphon, reducing the hydrostatic head within the aforesaid hydrostatic trap.

The other features of arrangements or devices in accordance with the principle of the present invention will be apparent from the following descriptive specification and accompanying drawings.

A known mode of operation has been described, of an arrangement controlling the discharge from such siphons by means of such a hydrostatic trap, in particular applicable to the siphons of water-closet systems: the corresponding arrangement for controlling the outflow from such systems having the form of a box or receptacle having an inlet orifice communicating with the tank or cistern of the system and an outlet orifice connected to the corresponding discharge pipe; such inlet and such outlet being interconnected within the aforesaid box or receptacle by means of a duct having the form of a double siphon. The priming of such double siphon in order to enable the release of liquid from the cistern is in such case controlled and effected by destroying the hydrostatic equilibrium in the system, by means of a device termed a "hydrostatic trap"; such hydrostatic trap and such double siphon intercommunicating by means of apertures or ports in an intermediate partition.

In the arrangement now being discussed, the destruction of the hydrostatic equilibrium within the hydrostatic trap is produced by lowering the air pressure therein by the operation of a special lever. Owing to this destruction of the hydrostatic equilibrium, the effective head of the liquid in the hydrostatic trap is reduced, thus allowing the air to escape entirely from the double siphon through one of the openings in the intermediate partition, as a result of which the aforesaid siphon becomes primed, and the liquid contained in the closet cistern is completely evacuated.

On completion of such evacuation, the double siphon is unprimed by admitting air through an airhole in one wall of the siphon, situated at a level above that of the intake of liquid to the said double siphon; this airhole being of special form and design, enables the unpriming of the siphon to proceed silently, the consequent admission of air from outside the siphon thus immediately restoring the internal atmospheric equilibrium after termination of the outflow of liquid in such manner that the level of the liquid in the aforesaid hydrostatic trap is sufficient for the further operation or action thereof. The same admission of air to the double siphon, finally, ensures that on termination of the outflow of liquid from the cistern, practically the whole of the liquid retained in the bottom of the double siphon is likewise evacuated.

However, practical operation of an arrangement and a device in accordance with the above-said, has disclosed the following defects:

(1) If pipes of usual type are used for delivering the liquid to the cistern, the first evacuation of the cistern after complete assembly of the arrangement must be initiated by charging the cistern with liquid, by means of a pail or the like, with the object of filling the hydrostatic trap in readiness for first evacuation.

(2) Partial obstruction of the cistern discharge pipe may cause an insufficient supply of liquid to the hydrostatic trap and, consequently, a delay in the re-establishment of the necessary atmospheric equilibrium in the system.

(3) On termination of the outflow, the liquid remining at the bottom of the double siphon may have a level higher than the head in the hydrostatic trap, thus causing an escape of air from the double siphon before the liquid in the cistern has attained the required working level.

In the presence of the defects mentioned, subs. (2) and (3) above, the liquid flowing into the closet cistern will not meet with the appropriate and necessary resistance in the hydrostatic trap and on leaving the said cistern will discharge through the double siphon without attaining the required working level in the cistern.

(4) Since the unpriming of the double siphon takes place at a level appreciably higher than the level of the intake of liquid to the double siphon, the discharge of the liquid contained in the cistern will not be complete. A certain quantity of liquid, always the same, thus remains at the bottom of the cistern, and consequently assumes all the unhygienic characteristics of stagnant water.

(5) Since the actuating lever is operated by being depressed, the impression is easily given, if it is pulled down and not released to await discharge of the cistern, that the mechanism is out of order; in actual fact, the suction necessary to operate the arrangement is produced only when the lever is released and allowed to return to its initial position.

(6) The cistern frequently discharges automatically, in view of the very narrow limits between which the closing of the water supply to the cistern by the standard form of ball-cock can be regulated. Since this adjustment may vary owing to progressive adjustment of the closing elements, the liquid entering the cistern may attain such a high level that the equilibrium established by the head of water in the hydrostatic trap is destroyed.

The object of the invention is the provision of an improved arrangement incorporating a double siphon and a hydrostatic trap, eliminating the above-mentioned disadvantages. In particular, defect (1) is eliminated by retarding the water feed to the hydrostatic trap; in the earlier arrangement water is admitted at the same time as the discharge, whereas according to the invention, water is admitted only after the discharge has been completed; this modification is also capable of eliminating defect (2) if the design is altered in such manner as to ensure that the hydrostatic trap always receives an excess of liquid. Furthermore, the invention enables evacuation of the excess liquid retained in the bottom of the double siphon at the end of the discharge from the cistern, by the provision of a small, auxiliary siphon communicating at one end with the discharge pipe and at the other end with the bottom of the double siphon. Defect (4) is eliminated by dispensing with the elements for silent discharge, incorporated in the previous arrangement. In accordance with the invention, the above-mentioned air admission is effected by exposing the water intake from the cistern to the double siphon.

Defect (5) is eliminated according to the invention by using an operating lever capable of destroying the hydrostatic equilibrium within the hydrostatic trap either by a compression effect causing expulsion of a part of the liquid forming the effective pressure head in the trap, or by a suction effect during the return motion of the operating lever, removing from above the pressure head a quantity of air capable of causing destruction of the condition of equilibrium within the hydrostatic trap.

The elimination of the defect (6), i. e., the elimination of automatic discharge from the cistern owing to the narrow limits of level within which the admission of water to the cistern can be regulated, is ensured by suitable utilization of the liquid meniscuses forming in the ducts or passages of the arrangement, and by increasing the diameter of such passages.

On the attached drawings:

Fig. 1 represents a vertical section through the hydrostatic trap according to the present invention.

Fig. 2 is a vertical section through the double siphon forming part of the same arrangement, such section being in a plane parallel to and behind that of the section shown in Fig. 1.

Fig. 3 is a vertical section through a cistern of usual type, for water closets, incorporating the arrangement in accordance with the present invention.

In accordance with the manner of realization of the invention, described and illustrated below, the discharge arrangement is constituted by a chamber having an inlet aperture A and an outlet aperture B, communicating with the discharge or outlet pipe C. These apertures are situated in the part of the chamber acting as a double siphon, and shown in greater detail in the Fig. 2. The portion of the chamber acting as a hydrostatic trap or seal, Figs. 1 and 3, is connected to a pipe 22, controlling the discharge of the water from the tank, by an operation organ such as plunger 23 (Fig. 3).

The portion of the chamber forming the hydrostatic trap or seal, is separated from the portion containing the double siphon, by an intermediate partition or wall in which openings are provided, allowing communication between the two compartments only in correspondence to desired points, as will be described presently. The hydrostatic trap comprises the ducts or passages 1, 2, 3, 4. The ducts 1 and 2 communicate through an aperture 5 (Fig. 3) with the upper part of the pipes 6 and 7 of the double siphon (Fig. 2), while the pipes 3 and 4 communicate through an aperture 8 (Fig. 3) with the upper part of the pipes 9 and 10 (Fig. 2), of the double siphon. Furthermore, the pipe 1 communicates through the orifice 11, with the pipe 6, of the double siphon, at a point 12 slightly lower than the summit 13 of the peak between the pipe 6 and the pipe 7, of the double siphon (Fig. 2). Consequently, the greatest effective head capable of being formed within the hydrostatic trap, is the difference of level between the points 14 and 15 (Fig. 1).

A small siphon formed by the pipes 16 and 17 is contained in the pipe 4 of the hydrostatic trap, its tube 17 communicating with a second small pipe 18 and further, through an aperture 19, with the tube 10 of the double siphon (Fig. 3). Furthermore, the small siphon communicates with the operating plunger 23 by means of a pipe 20, a union nut 21, and a duct 22.

During the first filling of the cistern 36 after the arrangement has been assembled, the liquid rises in the pipe 6 of the double siphon, maintaining a constant level in the cistern, while, simultaneously, air can escape freely through the pipes 7, 9 and 10 of the double siphon, these pipes being empty, or being emptied after each discharge from the cistern, as will be presently explained. When the liquid in the pipe 6 attains the level 12 (Fig. 1) it flows into the tube 1 of the hydrostatic trap through the aperture 11, and consequently, also fills the pipes 2, 3, 4 of the said hydrostatic trap.

The liquid rising in the pipe 6 overflows into the pipe 7 above the level 13 and, upon reaching the level 24, closes the exit of air from the aforesaid pipe 7, thus preventing it from reaching the escape aperture B through the pipes 9 and 10. Subsequently, the level of the water in the cistern 36 rises relatively to the level of the water in the pipe 6 of the double siphon, when the liquid column between these two levels will be balanced by the column of liquid in the pipe 9.

In the hydrostatic trap, on the other hand, equilibrium is maintained by the column of liquid formed between the water level in the pipes 1 and 2, and the water level in the pipes 3 and 4. In these latter pipes the water level rises on account of the pressure of the air contained in the upper part of the pipes 6 and 7 of the double siphon, which pressure is transmitted also to the pipes 1 and 2 of the hydrostatic trap through the aperture 5.

The maximum value of this head of water between the levels 14 and 15 of the hydrostatic trap, is slightly greater than the value of the pressure head forming in the cistern 36 above the level of the water in the pipe 6 of the double siphon, when the liquid has reached a sufficiently high level for discharge into the aforesaid cistern.

However, it may happen that, while the water level rises in the pipes 3 and 4 of the hydrostatic trap, it rises also in the pipe 16, passing thence into the pipe 17 when it has risen beyond the level 25. In such case, the small siphon formed by the pipes 16 and 17 is primed, and operates to withdraw completely the water contained in the space formed by the wider portion at the top of the pipe 4, since the outflow of water from the pipe 6 through the aperture 11 is equal to the discharge from the small siphon.

In these conditions, the maximum value of the head formed in the pipes 3 and 4 of the hydrostatic trap is no longer equal to the head between the levels 14 and 15, but is balanced by the column of liquid between the levels 14 and 26. Consequently, the hydrostatic trap operates automatically as soon as the column of liquid between the water levels in the cistern 36 and the pipe 6 of the double siphon respectively, exceeds this value, which is much lower, in regard to the corresponding head, than the value attained when the water in cistern 36 is at the normal level, but is still sufficient to cause the cistern to discharge.

During successive fillings of the cistern 36 (since, at the instant of unpriming, the pipes 16 and 17 of the small, controlling siphon, and therefore also the pipe 20, retain a certain quantity of water nearly reaching the level 27 in the pipe 18), when the liquid rises in the pipe 4 of the hydrostatic trap until it reaches the level 28 and also tends to rise in the pipe 16, the air contained in the pipes 16 and 17 can no longer escape through the aperture 19 and consequently, in the measure and to the extent that the level of the liquid rises in the pipe 16, a pressure head forms between the water levels in the pipes 17 and 18, this head being capable of balancing the head formed between the level in the pipe 4 of the hydrostatic trap and the level in the pipe 16 of the small siphon.

When the liquid has reached its ordinary level in the cistern, the arrangement in accordance with the present invention will be in the following condition: in the double discharge siphon, the pipe 6 is filled with water up to the level 12, the pipe 7 is empty to a level slightly beyond 24, and the pipe 9 is filled with liquid nearly to the level 35; in the hydrostatic trap, the pipes 1 and 2 are filled with water to a level exceeding by a few millimetres the level 14, while in the pipes 3 and 4 the liquid reaches the level 15; in the small controlling siphon 16, 17 the pipe 16 is filled with water nearly to 25, while the pipe 17 is completely empty; the pipe 18 is filled with water up to the level 27.

From the abovesaid, it is evident that the head of liquid in the cistern 36 above the water level in the pipe 6 is balanced in the double discharge siphon, by the column of liquid in the pipe 9, and, in the hydrostatic trap, by the column of liquid between the levels 14 and 15. In the small siphon 16—17, on the contrary, the column of liquid between 15 and 25, is balanced by the column of liquid between 27 and 29.

In the conditions indicated above, if a slight air pressure is applied in the pipe 20 by the action of the operating lever and plunger, a part of the liquid in the tube 18 will be forced through the aperture 19, thus reducing the value of the head of liquid between 27 and 29, and causing the priming of the small siphon 16—17; consequently, the liquid contained in the pipe 4 of the hydrostatic trap will discharge through the aperture 19, the pipe 10 of the double siphon, and the outflow pipe C. In such manner, the effective head in the hydrostatic trap is reduced and, since this head is then no longer sufficient to balance the pressure head formed in the cistern 36, the hydrostatic trap operates, with the consequence that the air contained in the pipe 7 of the double discharge siphon is completely expelled through the aperture 5, the pipes 2, 3, 4, and a communicating orifice 8 between the pipe 4 of the hydrostatic trap and the pipe 10 of the double siphon.

In accordance with the arrangement shown in Fig. 3, the actuating element is formed by a small plunger working in a cylinder with a slight amount of friction and returned to its normal position by a spring as soon as the operating button is released. During its forward stroke, i. e., while the operating button is being pressed, the plunger compresses the air in the pipe 20 through the duct 22 and the union 21, this pressure reducing the height of the column of liquid in the pipe 18, since a part of this liquid is expelled through the aperture 19. During its return stroke, i. e., when it is actuated by the spring, this plunger produces a suction effect in the pipe 20 and consequently a part of the air contained in the pipe 17 is drawn into the former pipe.

The discharging device in accordance with the invention is completed by another small siphon, consisting of the two pipes 30 and 31. The lower end of the tube 30 communicates through the aperture 32 with the bottom F of the double discharge siphon between the pipes 7 and 9, while the lower end of the pipe 31 is in communication with the lower part of the pipe 10 of the double discharge siphon through an aperture 33, and is consequently also in communication with the atmosphere through the discharge pipe C. During operation of the arrangement the siphon 30—31 is primed, but since its water level 34 is above the level 35 in the double siphon, it can only be kept primed by the suction due to the outflow of liquid through the pipe 10 and the duct C. The double siphon 6—7—9—10 is unprimed when the cistern is empty, while the small siphon 30—31 continues to operate until discharge of all the liquid still remaining in the bottom F of the double discharge siphon.

Obviously, the arrangement described will continue to function perfectly even if the level of the liquid in the cistern 36 rises considerably above the intended level, since in the latter case the greater head of liquid in the cistern 36, above the level in the pipe 6, is no longer balanced by the head between 14 and 15, and consequently the hydrostatic trap will act automatically without necessity for operating the control lever or button. This arrangement eliminates the danger of the water overflowing from the cistern, for instance on account of fracture of the feed pipe or sticking of the valve controlling the feed to the cistern. If an arrangement with periodic flushing is required, it is only necessary to remove the elements controlling the action of the hydrostatic trap, i. e., the push-button 23, the duct 22, the union 21, and the pipes 20, 16, 17 and 18, and control the admission of water to the cistern 36.

In accordance with the invention, the above arrangement may be adapted to operate without the necessity for filling the cistern 36. It is evident that, if the push-button 23 is operated during filling of the cistern 36, a part of the liquid contained in the pipes 17 and 18 will be expelled through the aperture 19 and the remaining quantity of liquid will be insufficient to establish the necessary head of water between the levels 27 and 29, i. e., a column of liquid sufficient to balance the head between the levels 15 and 25. Therefore, the small siphon 16—17 will be primed, and remains primed until complete evacuation, through the aperture 19, of the whole quantity of liquid admitted into the hydrostatic trap through the aperture 11, before the liquid reaches its normal level in the cistern 36. In such manner it is impossible for a head of liquid to be formed in the hydrostatic trap, higher than that formed between the levels 14 and 26, and consequently, the hydrostatic trap will act automatically as intended, with ensuing priming of the double discharge siphon.

The invention has been described and illustrated in a particular form but it is obviously possible to introduce structural modifications without infringing on the essential character and features claimed for it.

I claim:

1. A device for the discharge of liquid from a cistern, comprising a chamber including a vertical partition dividing said chamber into a first and a second compartment, dividing walls in said first compartment so as to form therein a double siphon having four connected legs, said double siphon having an inlet in said first leg for communication with the cistern into which said device is to be fitted, and having an outlet in the fourth leg for connection to a discharge pipe, a hydrostatic trap, a small control siphon connected to said trap, said trap and said control siphon being formed in said second compartment, said partition being provided with openings whereby the pressure head occurring in said trap can be substantially equal to that occurring in said double siphon, and operative means to prime said control siphon thereby to cause a disturbance of the hydrostatic equilibrium in said second compartment in order to prime said double siphon.

2. A device as claimed in claim 1, said inlet of said double siphon being located at the bottom of said first compartment so as to be closely above the bottom of said cistern when said chamber is fitted into it, whereby the entire quantity of liquid contained in said cistern will be discharged when said double siphon has been primed.

3. A device as claimed in claim 1, a first one of said openings in said partition being located immediately adjacent the upper end of the first leg of the double siphon the lower end of which forms said inlet, said opening being situated slightly below the summit of the wall between the first and the second leg of said double siphon, thereby to insure, when the device is entirely empty, complete filling of said trap and establishing within it, during the filling of the cistern into which the device is fitted, a column of liquid maintaining the required hydrostatic equilibrium.

4. A device as claimed in claim 1, further comprising a small auxiliary siphon, the one end of said auxiliary siphon communicating with said third leg of said double siphon through a second one of said openings, the other end of said auxiliary siphon communicating with said fourth leg and thus with the discharge of said double siphon through a third one of said openings, thereby to enable the removal of liquid from the bottom of said double siphon so as to insure the free exit of air from the first leg of said double siphon.

5. A device as claimed in claim 1, one end of said control siphon being connected to the end leg of said trap, the other end of said control siphon being in communication with the fourth leg of said double siphon through a fourth one of said openings, said fourth opening being located at such a height that a column of liquid formed in said control siphon is capable of balancing the head of liquid forming in the hydrostatic trap during the filling of the cistern into which said device may be fitted.

6. A device as claimed in claim 1, further comprising a control organ including a cylinder and a plunger operative therein, a pipe connecting said cylinder to said control siphon, whereby movement of the plunger in the one direction will cause a compression of the air in said control siphon and thus an expulsion of part of the liquid therein, and whereby return movement of the plunger will also cause priming of said control siphon and thus of the entire system owing to a suction effect reducing the head in the control siphon by an intake of air.

RUGGERO NICCOLAI.

REFERENCES CITED

The following references are of record in the file of this patent:

UNITED STATES PATENTS

| Number | Name | Date |
|---|---|---|
| 753,174 | Smith | Feb. 23, 1904 |

FOREIGN PATENTS

| Number | Country | Date |
|---|---|---|
| 192,799 | Switzerland | Nov. 16, 1937 |
| 442,675 | Great Britain | Feb. 10, 1936 |